(12) United States Patent  
Hamada

(10) Patent No.: US 7,778,137 B2  
(45) Date of Patent: Aug. 17, 2010

(54) VERY SMALL SPOT-SIZE LIGHT BEAM FORMING APPARATUS

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 12/143,170

(22) Filed: Jun. 20, 2008

(65) Prior Publication Data

US 2008/0316899 A1    Dec. 25, 2008

(30) Foreign Application Priority Data

Jun. 21, 2007    (JP)    ............................. 2007-163669

(51) Int. Cl.
*G11B 7/00*    (2006.01)
(52) U.S. Cl. ........................... 369/112.01; 369/112.23; 369/44.23
(58) Field of Classification Search ........................ None
See application file for complete search history.

(56) References Cited

U.S. PATENT DOCUMENTS

| 6,834,027 | B1 * | 12/2004 | Sakaguchi et al. | ....... 369/13.32 |
| 7,227,643 | B2 * | 6/2007 | Saeki | ...................... 369/275.2 |
| 2004/0125704 | A1 * | 7/2004 | Ishi et al. | ................. 369/13.05 |

FOREIGN PATENT DOCUMENTS

JP    2001-184702    7/2001

OTHER PUBLICATIONS

Liu et al., "Near-field optical storage system using a solid immersion lens with a left-handed material slab", *Optics Express*, vol. 12, No. 20, 2004.
Pendry, "Negative Refraction Makes a Perfect Lens", *Physical Review Letters*, vol. 85, No. 18, pp. 3966-3969, 2000.
Shelby et al., "Microwave transmission through a two-dimensional, isotropic, left-handed metamaterial", *Applied Physics Letters*, vol. 78, No. 4, 2001.
Luo et al., "All-angle negative refraction without negative effective index", *Physical Review B*, Vo. 65, 2002.

* cited by examiner

*Primary Examiner*—Muhammad N. Edun
(74) *Attorney, Agent, or Firm*—Wenderoth, Lind & Ponack, L.L.P.

(57) ABSTRACT

A very small spot-size light beam forming apparatus of the present invention comprises: a conductive film for generating a surface plasmon when an inputted light is applied thereto: a plurality of nano projections, each connected to the conductive film at one end, for receiving a portion of the surface plasmon, and outputting a plurality of input surface plasmons, respectively, from the other end of each of the plurality of nano projections, the other end of each of the plurality of nano projections having a diameter smaller than a wavelength of the inputted light; a coupling unit, connected to the other end of each of the plurality of nano projections, for receiving and coupling the plurality of input surface plasmons, so as to generate a coupled surface plasmon; and a negative-refractive-index lens, connected to the coupling unit and having a negative refractive index, for receiving a near-field light generated due to the coupled surface plasmon, and collecting the near-field light on a recording surface of the optical information storage disk, and a near-field light obtained through collection on the recording surface has a diameter smaller the wavelength of the inputted light.

7 Claims, 5 Drawing Sheets

VERY SMALL SPOT-SIZE LIGHT BEAM FORMING APPARATUS

BACKGROUND OF THE INVENTION

1. Field of the Invention

The present invention relates to a very small spot-size light beam forming apparatus for use in an optical information storage apparatus for storing information in an optical information storage disk in high density.

2. Description of the Background Art

In response to increase of density in which information is stored in an optical information storage disk, a very small spot-size light beam forming apparatus (optical recording head) for storing information with a resolution greater than light diffraction limit is suggested. Some of the apparatuses use scanning near field optical microscopes to which the principle of a probe microscope is applied. The scanning near field optical microscope reduces the diameter of an end portion (opening) of an optical waveguide such as an optical fiber so as to be sufficiently smaller than a wavelength of a propagating light such that a near field light is generated in a range having a micro diameter, which is smaller than the wavelength of the propagating light. Thus, the scanning near field optical microscope can be used as a very small spot-size light beam forming apparatus for storing information with a resolution greater than a light diffraction limit.

However, as described above, a diameter of an opening of an optical fiber or the like is sufficiently smaller (for example, smaller than or equal to 100 nm) than a wavelength of a propagating light, and therefore an amount of light applied to an optical information storage disk is reduced. Therefore, there is a problem (hereinafter, referred to as Problem 1) that it is difficult to preferably obtain a recording mark on the optical information storage disk. Further, a near field light generated at an opening of an optical fiber or the like has characteristic that the further the near field light goes from the opening, the more abruptly the near field light attenuates. Therefore, there is a problem (hereinafter, referred to as Problem 2) that, in order to obtain a recording mark on an optical information storage disk, a distance between an end portion (an opening at which the near field light is generated) of the very small spot-size light beam forming apparatus and a recording surface of the information storage disk needs to be always about $\lambda/4$ ($\lambda$ represents a wavelength of a light propagating through an optical fiber or the like), which represents a substantially micro distance.

A very small spot-size light beam forming apparatus for solving Problem 1 is disclosed in Japanese Laid-open Patent Publication No. 2001-184702 (hereinafter, simply referred to as Document 1). The very small spot-size light beam forming apparatus disclosed in Document 1 includes a plurality of openings, and applies, through the plurality of openings, lights for recording to a same one track of an information storage disk multiple times. Thus, the very small spot-size light beam forming apparatus disclosed in Document 1 is allowed to preferably obtain a recoding mark on the optical information storage disk by applying a sufficient amount of light.

A very small spot-size light beam forming apparatus for solving Problem 2 is disclosed in Document 2. The very small spot-size light beam forming apparatus disclosed in Document 2 uses, as a lens, a material (refer to Document 4 and Document 5) which has a negative refractive index and exerts a perfect lens effect (refer to Document 3) that images (point light source) of incident lights which are not influenced by a light diffraction limit can be collected as a perfect same one light image (point light source). Therefore, in the very small spot-size light beam forming apparatus disclosed in Document 2, a distance between an end portion (end portion of a lens having a negative-refractive-index) of the apparatus and a recording surface of an information storage disk can be almost the same as a wavelength $\lambda$ of a light propagating through an optical fiber or the like, thereby facilitating a control. According to Document 2, a solid immersion lens is used so as to form a point light source.

Document 1: Japanese Laid-Open Patent Publication No. 2001-184702

Document 2: "Near-field optical storage system using a solid immersion lens with a left-handed material slab", Opt. Exp., Vol. 12, No. 20, pp. 4835 to 4840 (2004) FIG. 1

Document 3: J. B. Pendry, "Negative Refraction Makes a Perfect Lens", Phys. Rev. Lett. 85, 3966 to 3969 (2000)

Document 4: R. A. Shelby, D. R. Smith, S. C. Nemat-Nasser, and S. Schultz, "Microwave transmission through a two-dimensional, isotropic, left-handed metamaterial" Appl. Phys. Lett., Vol. 78, No. 4, pp 489 to 491 (2001)

Document 5: Chiyan Luo, Steven G. Johnson, J. D. Joannopoulos, and J. B. Pendry, "All-angle negative refraction without negative effective index" Phys. Rev. B, Vol. 65, 201104 (R) (2002)

However, the very small spot-size light beam forming apparatus disclosed in Document 1 applies lights for recording to a same one track of an optical information storage disk multiple times, thereby causing another problem (hereinafter, referred to as Problem 3) that a rate at which information is recorded is reduced. Further, simple combination of the technique disclosed in Document 1 with the technique disclosed in Document 2 does not lead to solution of Problem 3.

SUMMARY OP THE INVENTION

Therefore, an object of the present invention is to provide a very small spot-size light beam forming apparatus for solving Problem 1 and Problem 2 described above, and further solving Problem 3 that a rats at which information is recorded in an optical information storage disk is reduced.

The present invention is directed to a very small spot-size light beam forming apparatus for storing information in an optical information storage disk. In order to attain the object mentioned above, the very small spot-size light beam forming apparatus of the present invention comprises: a conductive film for generating a surface plasmon when an inputted light is applied thereto; a plurality of nano projections, each connected to the conductive film at one end, for receiving a portion of the surface plasmon, and outputting a plurality of input surface plasmons, respectively, from the other end of each of the plurality of nano projections, the other end of each of the plurality of nano projections having a diameter smaller than a wavelength of the inputted light; a coupling unit, connected to the other end of each of the plurality of nano projections, for receiving and coupling the plurality of input surface plasmons, so as to generate a coupled surface plasmon; and a negative-refractive-index lens, connected to the coupling unit and having a negative refractive index, for receiving a near-field light generated due to the coupled surface plasmon, and collecting the near-field light on a recording surface of the optical information storage disk, and a near-field light obtained through collection on the recording surface has a diameter smaller than the wavelength of the inputted light.

Further, the coupling unit may be a rectangular film made of a conductive material, and may be connected to the other end of each of the plurality of nano projections at positions, respectively, on a first edge of the coupling unit such that the plurality of nano projections form a structure symmetric with respect to a center of the first edge, and may generate a multimode interference among the plurality of input surface plasmons having been inputted thereto, and couple the plurality of input surface plasmons so as to generate the coupled surface plasmon at a center of a second edge opposite to the first edge.

Further, the coupling unit may be a film unit which is made of a conductive material and shaped such that a plurality of rectangular films intersect each other at a center of a first edge of each rectangular film and a center of a second edge, of each rectangular film, opposite to the first edge, and may be connected to the other end of each of the plurality of nano projections at positions, respectively, on the first edge of each rectangular film such that the plurality of nano projections form a structure symmetric with respect to the center of the first edge of each rectangular film, and may generate a multimode interference among the plurality of input surface plasmons having been inputted thereto, and couple the plurality of input surface plasmons so as to generate the coupled surface plasmon at the center of the second edge of each rectangular film.

Further, preferably, the very small spot-size light beam forming apparatus comprises an optical transmission path, connected to the conductive film, for propagating the inputted light, and applying the inputted light to the conductive film.

Further, preferably, the inputted light is applied from the optical transmission path no the conductive film at such an incident angle as to generate the surface plasmon.

Further, the wavelength of the inputted light may be greater than or equal to 400 nm, and a diameter of the near-field light obtained through the collection on the recording surface may be smaller than or equal to 100 nm.

Further, the conductive film, the plurality of nano projections, and the coupling unit may be made of metal.

As described above, according to the present invention, it is possible to prevent lack of an amount of light applied to an optical information storage disk, and to preferably obtain a recording mark on the optical information storage disk. Further, it is possible to extend a distance between the recording surface of the optical information storage disk and the end portion (end portion of the negative-refractive-index lens) of the very small spot-size light beam forming apparatus so as to represent almost a wavelength λ of a light used, thereby enabling easy control. Further, according to the present invention, it is possible to solve the problem that a rate at which information is recorded in the optical information storage disk is reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
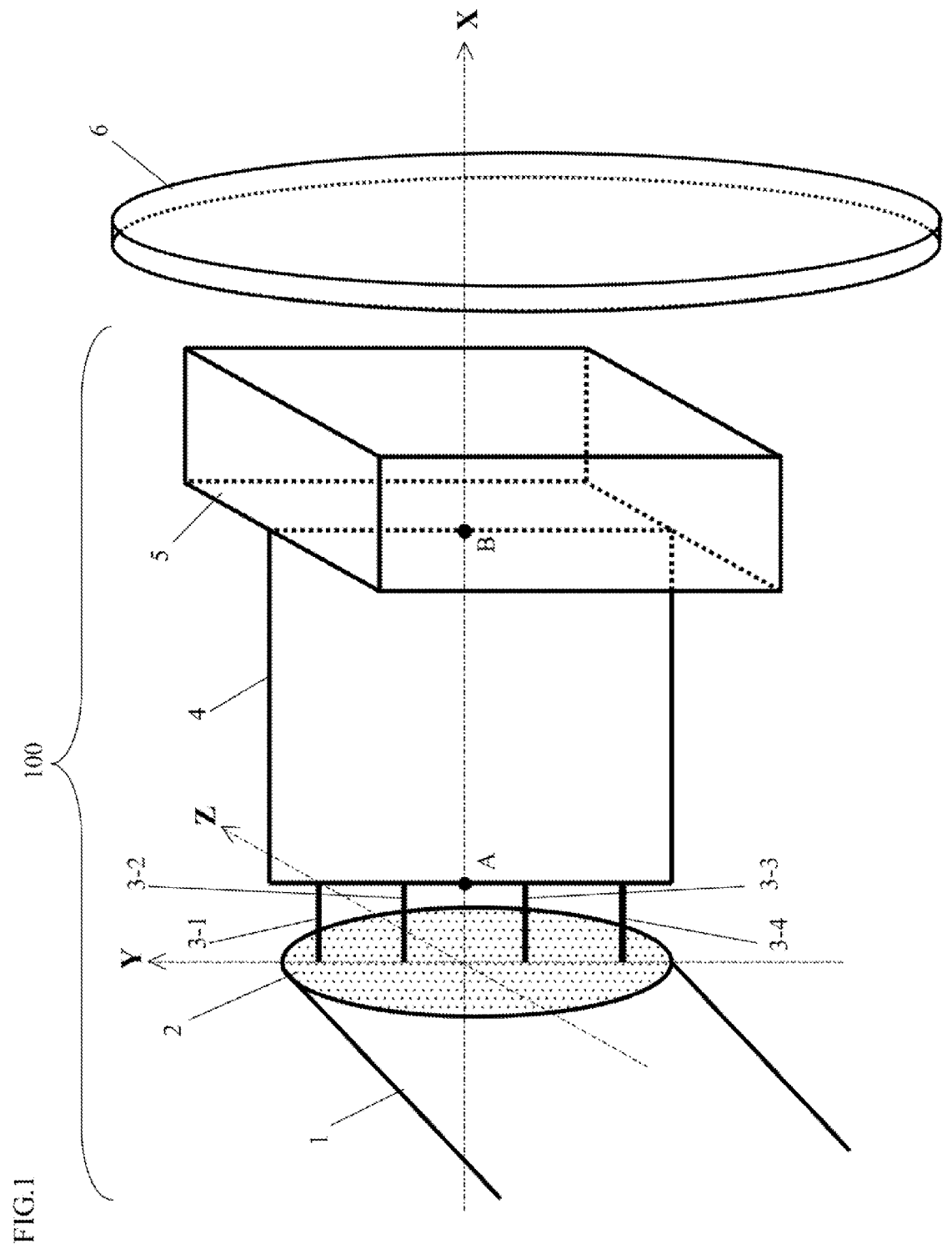
FIG. 1 is a perspective view illustrating an exemplary configuration of a very small spot-size light beam forming apparatus 100 according to a first embodiment of the present invention.
Figure 2:
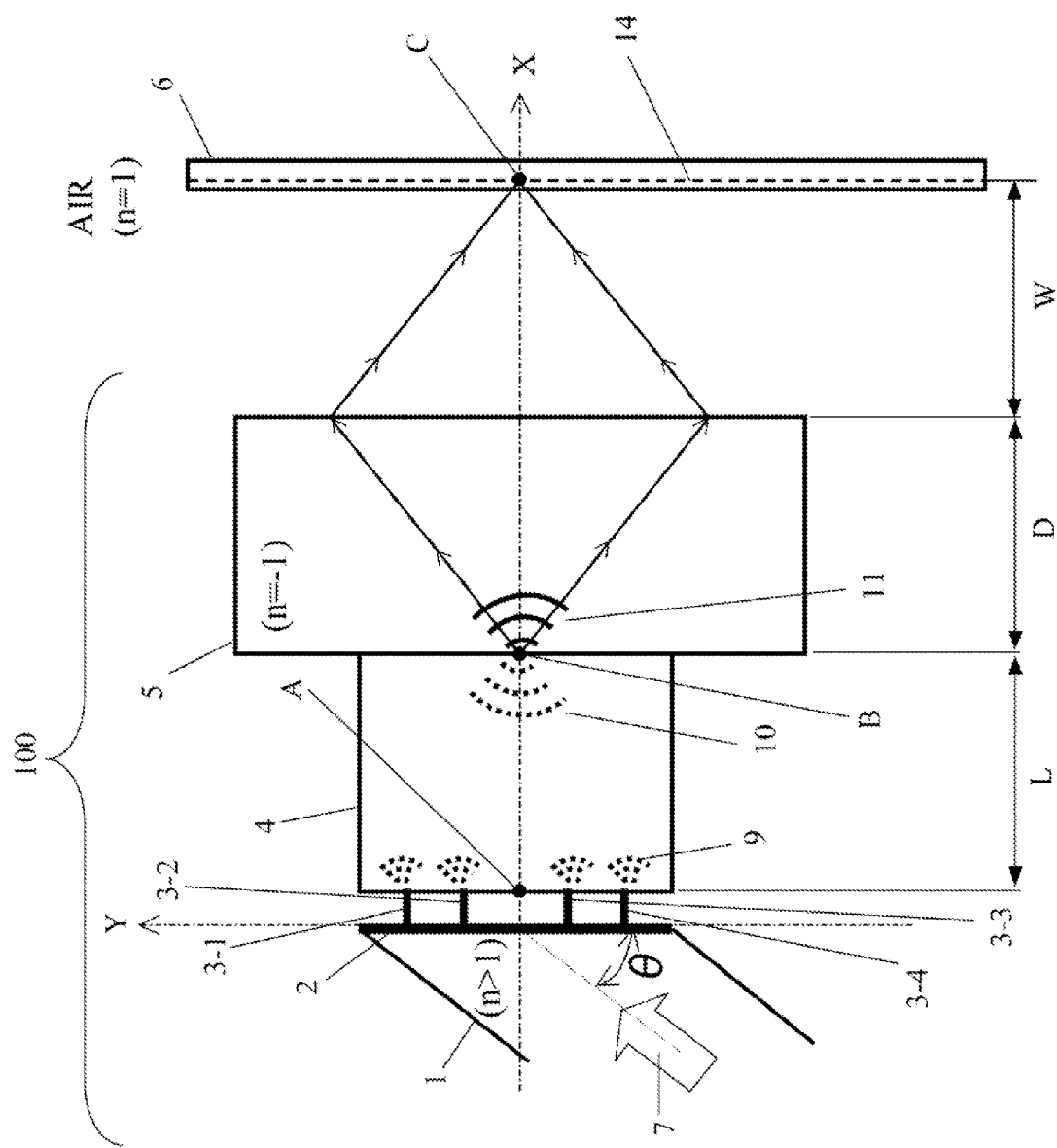
FIG. 2 is an elevation view of the very small spot-size light beam forming apparatus 100 as viewed in the Z-direction shown in FIG. 1.

FIG. 1 is a perspective view illustrating an exemplary configuration of a very small spot-size light beam forming apparatus 100 according to a first embodiment of the present invention. FIG. 2 is an elevation view of the very small spot-size light beam forming apparatus 100 as viewed in the Z-direction shown in FIG. 1. Hereinafter, the first embodiment will be described with reference to FIGS. 1 and 2.

The very small spot-size light beam forming apparatus 100 comprises: an optical transmission path 1; a metal film 2; metal nano projections 3-1, 3-2, 3-3, and 3-4; a coupling unit 4; and a negative-refractive-index lens 5. The optical information storage disk 6 is not a component of the very small spot-size light beam forming apparatus 100. The optical transmission path 1 is an optical waveguide typified by an optical fiber. The metal film 2 is a film-shaped metal. The metal nano projections 3-1, 3-2, 3-3, and 3-4 are each a projection-shaped metal, and are each connected to the coupling unit 4 at a projection end portion having the diameter smaller than a wavelength of an inputted light 7 propagating through the optical transmission path 1 as described later. The coupling unit 4 is a rectangular metal film. The negative-refractive-index lens 5 is a lens (refer to Documents 4 and 5) having a negative refractive index, and is a plane lens having two surfaces parallel with each other.

The optical transmission path 1 is connected to one surface (hereinafter, referred to as an input surface of the metal film 2) of the metal film 2 so as to include no space between the optical transmission path 1 and the metal film 2. The other surface (hereinafter, referred to as an output surface of the metal film 2) of the metal film 2 is connected to one end (hereinafter, referred to as an input end of the metal nano projection) of each of the metal nano projections 3-1, 3-2, 3-3, and 3-4. The other end (hereinafter, referred to as an output end of the metal nano projection) of each of the plurality of metal nano projections 3-1, 3-2, 3-3, and 3-4 is connected to one edge (hereinafter, referred to as an input end of the coupling unit 4), among four edges, of the coupling unit 4. When the center position of the input end of the coupling unit 4 is represented as point A, the output ends of the metal nano projections 3-1, 3-2, 3-3, and 3-4 have a point symmetric structure with respect to point A. Specifically, a distance from point A to a connecting point between the coupling unit 4 and the output end of the metal nano projection 3-1 is equal to a distance from point A to a connecting point between the coupling unit 4 and the output end of the metal nano projection 3-4, and a distance from point A to a connecting point between the coupling unit 4 and the output end of the metal nano projection 3-2 is equal to a distance from point A to a connecting point between the coupling unit 4 and the output end of the metal nano projection 3-3. Among the four edges of the coupling unit 4, the edge (hereinafter, referred to as an output end of the coupling unit 4) parallel with the input end of the coupling unit 4 is connected to one of the parallel surfaces (hereinafter, the one of the parallel surfaces is referred to as an input surface of the negative-refractive-index lens 5) of the negative-refractive-index lens 5. Hereinafter, the surface, of the negative-refractive-index lens 5, parallel with the input surface thereof is referred to as an output surface of the negative-refractive-index lens 5.

Hereinafter, an operation performed by the very small spot-size light beam forming apparatus 100 will be described with reference to FIG. 2. In the following description, the very small spot-size light beam forming apparatus 100 operates in air (refractive index thereof=1). Firstly, the inputted light 7 is incident on the metal film 2 through the optical transmission path 1 at an incidence angle θ. The incidence angle θ is an incidence angle at which surface plasmon resonance is generated at the surface of the metal film 2. The refractive index of the optical transmission path 1 is greater than the refractive index of air. Therefore, the surface plasmon resonance is generated at the output surface, of the metal film 2, which is exposed to air having a light refractive index which is smaller than the optical transmission path 1. As a result, the surface plasmon of the output surface of the metal film 2 is excited. A portion of the excited surface plasmon of the output surface of the metal film 2 is inputted to the input end of the coupling unit 4 as four input surface plasmons 9 through the metal nano projections 3-1, 3-2, 3-3, and 3-4, respectively. The diameter of the output end of each of the metal nano projections 3-1, 3-2, 3-3, and 3-4 is smaller than the wavelength of the inputted light 7, so that the diameter of each input surface plasmon 9 is also smaller than the wavelength of the inputted light 7. The input surface plasmons 9 having been inputted are developed, in the coupling unit 4, into surface plasmons of a plurality of fixed modes. The surface plasmons of the plurality of fixed modes propagate through the coupling unit 4 while generating multimode interference thereamong, and are coupled to each other, as a coupled surface plasmon 10, at point B which is the center of the output end of the coupling unit 4. L representing a distance (the length of the coupling unit 4) between the input end of the coupling unit 4 and the output end thereof is represented by equation 1 in which N represents the number of the input surface plasmons 9 inputted to the coupling unit 4, and $L_n$ represents a beat length of an interference wave between the 0-order mode surface plasmon and the first-order mode surface plasmon.

[Equation 1]

$$L = \frac{3L_\pi}{4N} \quad (1)$$

The diameter of each input surface plasmon 9 is smaller than the wavelength of the inputted light 7, and therefore the diameter of the coupled surface plasmon 10 is smaller than the wavelength of the inputted light 7. Further, the coupled surface plasmon 10 has high energy, which is proportional to the number of the input surface plasmons 9.

A near-field light 11 is generated at point B due to the coupled surface plasmon 10. The diameter of the coupled surface plasmon 10 is smaller than the wavelength of the inputted light 7, and therefore the diameter of the near-field light 11 is also smaller than the wavelength of the inputted light 7. Further, the light amount of the near-field light 11 is increased so as to be proportional to the energy of the coupled surface plasmon 10. The near-field light 11 is inputted to the negative-refractive-index lens 5 through the input surface of the negative-refractive-index lens 5, and is collected as a near-field light 20 (not shown) at point C which is distanced by a predetermined distance W from the output surface of the negative-refractive-index lens 5. As described above, the negative-refractive-index lens 5 is capable of collecting images (point light source) of incident lights as a perfect same one light image (point light source). Therefore, the near-field light 20 has the same diameter and amount of light as the near-field light 11. That is, the near-field light 20 has the diameter smaller than the wavelength of the inputted light 7, and has a large amount of light which is proportional to the high energy of the coupled surface plasmon 10. W represents a value which is determined based on the refractive index of air, the refractive index of the negative-refractive-index lens 5, and the thickness D of the negative-refractive-index lens 5. Here, the refractive index n of air is 1. When the refractive index n of the negative-refractive-index lens 5=−1 is satisfied, W and D represent the same value.

The very small spot-size light beam forming apparatus 100 is allowed to record information by applying the near-field light 20 to a recording surface 14 of the optical information storage disk 6 when point C at which the near-field light 20 is collected is positioned on the recording surface 14 of the optical information storage disk 6.

As described above, the very small spot-size light beam forming apparatus 100 according to the first embodiment of the present invention is capable of generating, by using the coupling unit 4, the coupled surface plasmon 10 having the diameter smaller than the wavelength of the inputted light 7, and having energy greater than each input surface plasmon 9. In the very small spot-size light beam forming apparatus 100, the near-field light 11 generated due to the coupled surface plasmon 10 is inputted to the negative-refractive-index lens 5. Thus, the very small spot-size light beam forming apparatus 100 collects, at point C which is distanced by W from the output surface of the negative-refractive-index lens 5, the near-field light 11 as the near-field light 20 having the diameter smaller than the wavelength of the inputted light 7 and a large amount of light which is proportional to the energy of the coupled surface plasmon 10. As a result, the very small spot-size light beam forming apparatus 100 is capable of applying a sufficient amount of light to the optical information storage disk, so that a recording mark can be preferably obtained on the optical information storage disk, and a distance between the end portion (the output surface of the negative-refractive-index lens 5) of the apparatus and the recording surface 14 of the optical information storage disk 6 can be almost the same as the wavelength of the inputted light 7, thereby enabling easy control. Further, the very small spot-size light beam forming apparatus 100 need not apply lights for recording to a same one track of the optical information storage disk multiple times, thereby preventing reduction of a rate at which information is recorded.

Second Embodiment

Figure 3:
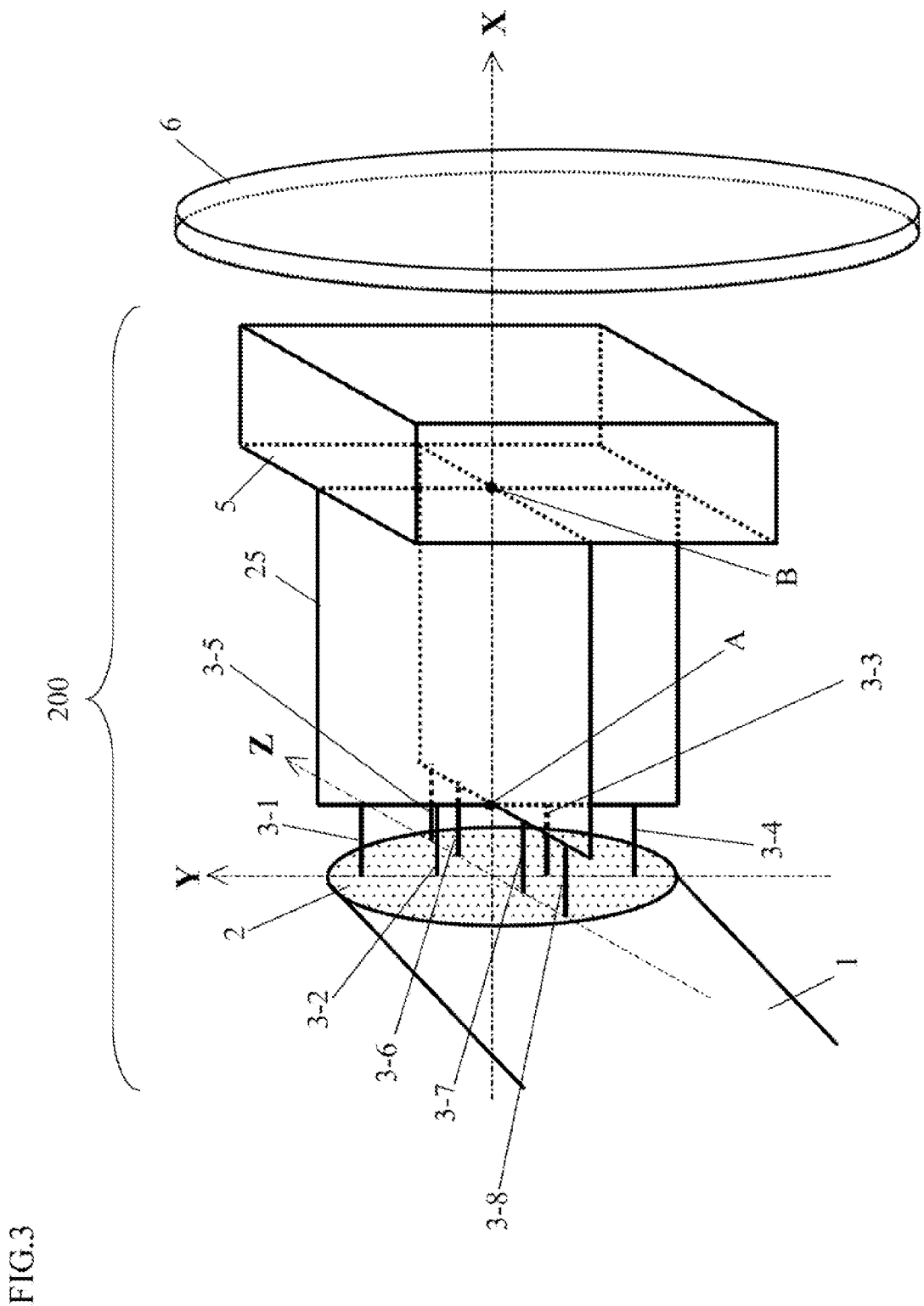
FIG. 3 is a perspective view illustrating an exemplary configuration of a very small spot-size light beam forming apparatus 200 according to a second embodiment of the present invention.

FIG. 3 is a perspective view illustrating an exemplary configuration of a very small spot-size light beam forming apparatus 200 according to a second embodiment of the present invention. The very small spot-size light beam forming apparatus 200 is different from the very small spot-size light beam forming apparatus 100 (as shown in FIG. 1) of the first embodiment in that in the very small spot-size light beam forming apparatus 200 a coupling unit 25 is used instead of the coupling unit 4 of the first embodiment, and metal nano projections 3-5, 3-6, 3-7, and 3-8 are added. The optical information storage disk 6 is not a component of the very small spot-size light beam forming apparatus 200. Further, for the very small spot-size light beam forming apparatus 200, the same components as those of the very small spot-size light beam forming apparatus 100 are denoted by the same corresponding reference numerals, and the description thereof is not repeated.

As shown in FIG. 3, the coupling unit 25 has such a shape that the two coupling units 4 (as shown in FIG. 2) intersect each other at point A and point B of each coupling unit 4. The input ends of the metal nano projections 3-1, 3-2, 3-3, 3-4, 3-5, 3-6, 3-7, and 3-8 are connected to the metal film 2. The metal nano projections 3-5, 3-6, 3-7, and 3-8 and the metal nano projections 3-1, 3-2, 3-3, and 3-4 described in the first embodiment represent the same characteristic. The output ends of the metal nano projections 3-1, 3-2, 3-3, and 3-4 have a point symmetric structure with respect to point A, and are connected to the input end of the coupling unit 25. Specifically, a distance from point A to a connecting point between the coupling unit 25 and the output end of the metal nano projection 3-1 is equal to a distance from point A to a connecting point between the coupling unit 25 and the output end of the metal nano projection 3-4, and a distance from point A to a connecting point between the coupling unit 25 and the output end of the metal nano projection 3-2 is equal to a distance from point A to a connecting point between the coupling unit 25 and the output end of the metal nano projection 3-3. Similarly, the output ends of the metal nano projections 3-5, 3-6, 3-7, and 3-8 have a point symmetric structure with respect to point A, and are connected to the input end of the coupling unit 25. Specifically, a distance from point A to a connecting point between the coupling unit 25 and the output end of the metal nano projection 3-5 is equal to a distance from point A to a connecting point between the coupling unit 25 and the output end of the metal nano projection 3-8, and a distance from point A to a connecting point between the coupling unit 25 and the output end of the metal nano projection 3-6 is equal to a distance from point A to a connecting point between the coupling unit 25 and the output end of the metal nano projection 3-7. The output end of the coupling unit 25 is connected to the input surface of the negative-refractive-index lens 5. The input end of the coupling unit 25 corresponds to the input end of the coupling unit 4, and is an end potion to which the input surface plasmons 9 are inputted (see FIG. 1 and FIG. 2). Similarly, the output end of the coupling unit 25 corresponds to the output end of the coupling unit 4, and is an end portion including, at the center thereof, point B at which the coupled surface plasmon 10 is generated.

In the above description, the coupling unit 25 has such a shape that the two coupling units 4 intersect each other at point A and point B of each coupling unit 4. However, the coupling unit 25 may have such a shape that three or more coupling units 4 intersect each other at point A and point B of each coupling unit 4.

The very small spot-size light beam forming apparatus 200, having the configuration as described above, according to the second embodiment of the present invention enables increase of the number of metal nano projections easily as compared to the very small spot-size light beam forming apparatus 100 according to the first embodiment. Therefore, the very small spot-size light beam forming apparatus 200 exerts the same effect as the very small spot-size light beam forming apparatus 100, and enables the light amount of the near-field light 20 to be increased easily as compared to the very small spot-size light beam forming apparatus 100.

In the first embodiment and the second embodiment, the metal film 2, the plurality of metal nano projections 3-1, 3-2, 3-3, 3-4, 3-5, 3-6, 3-7, and 3-8, and the coupling unit 4 (or the coupling unit 25) are each made of metal. However, these components may not necessarily be made of metal, and may be made of any conductive material.

Further, although in the first embodiment and the second embodiment, the number of the metal nano projections is four (and eight), the number of the metal nano projections may be any number greater than one. Increase of the number of the metal nano projections leads to increase of the number of the input surface plasmons 9, so that the coupled surface plasmon 10 generated in the coupling unit 4 (and the coupling unit 25) has increased energy. As a result, the light amount of the near-field light 20 collected at point C is further increased. Therefore, by changing the number of metal nano projections, an amount of light applied to the recording surface 14 of the optical information storage disk 6 can be adjusted.

Further, the very small spot-size light beam forming apparatus 100 and the very small spot-size light beam forming apparatus 200 operate in air (refractive index thereof n=1) according to in the first embodiment and the second embodiment, respectively. However, the very small spot-size light, beam forming apparatus 100 and the very small spot-size light beam forming apparatus 200 may operate in any other medium which has a refractive index representing a value other than one. In this case, the refractive index of the optical transmission path 1, the refractive index of the negative-refractive-index lens 5, and the like need to be appropriately set.

Further, in the first embodiment and the second embodiment, the optical transmission path 1 contacts with the metal film 2, the metal film 2 contacts with each of the metal nano projections 3-1, 3-2, 3-3, 3-4, 3-5, 3-6, 3-7, and 3-8, and the coupling unit 4 (or the coupling unit 25) contacts with the negative-refractive-index lens 5. However, the contacts as described above may not necessarily be needed when the surface plasmon can be transferred.

Third Embodiment

Figure 4:
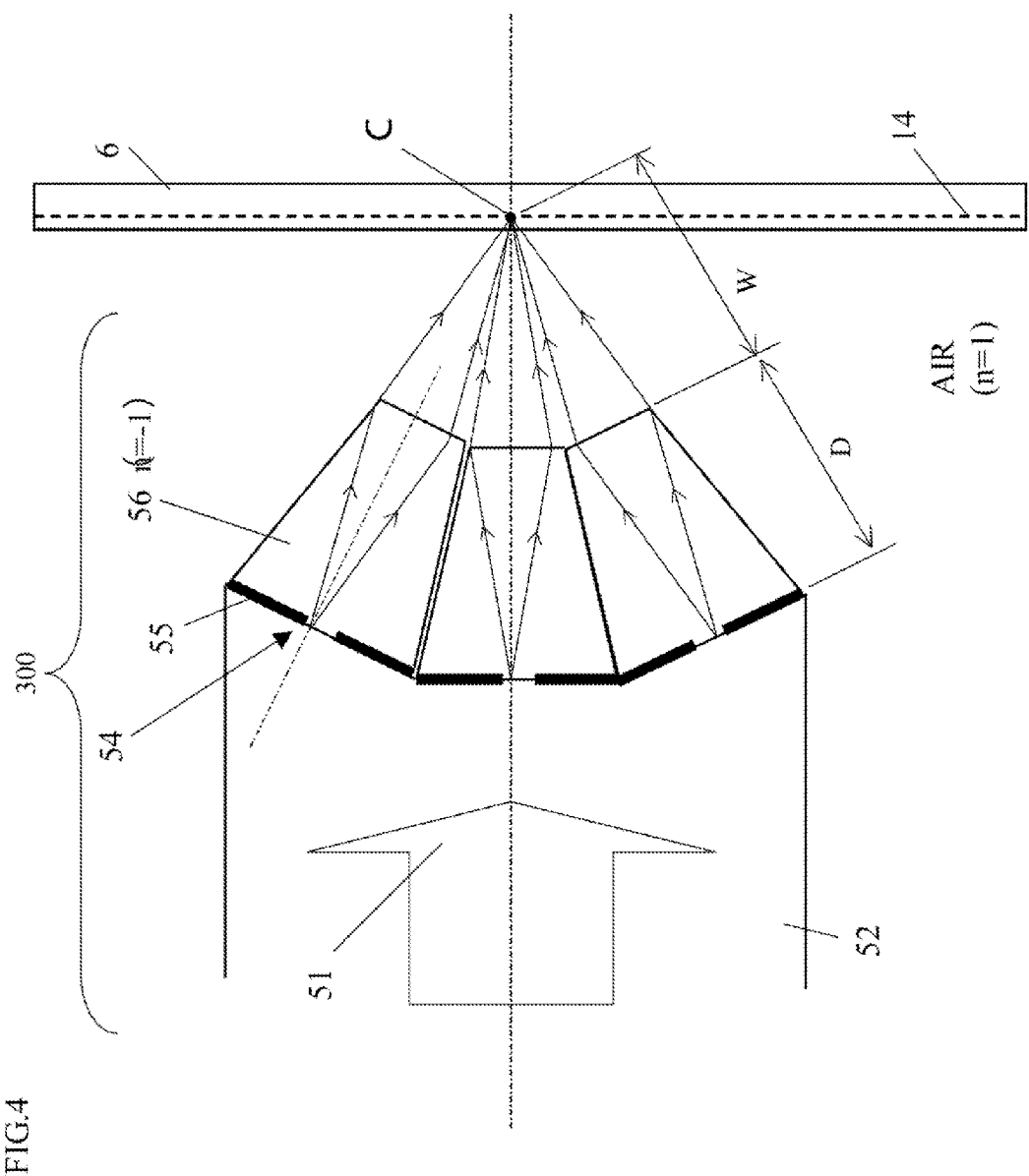
FIG. 4 is a diagram illustrating a very small spot-size light beam forming apparatus 300 according to a third embodiment of the present invention.

FIG. 4 is a diagram illustrating a very small spot-size light beam forming apparatus 300 according to a third embodiment of the present invention. As shown in FIG. 4, the very small spot-size light beam forming apparatus 300 comprises an optical transmission path 52, three metal films 55, and three negative-refractive-index lenses 56. The optical information storage disk 6 is not a component of the very small spot-size light beam forming apparatus 300. The optical transmission path 52 is an optical waveguide typified by an optical fiber. The metal films 55 are each a film-shaped metal, and each has an opening 54 having the opening diameter smaller than a wavelength of an inputted light 51 propagating through the optical transmission path 52. The negative-refractive-index lenses 56 are each a lens (refer to Documents 4 and 5) having a negative refractive index, and are each a plane lens having two surfaces parallel with each other.

The optical transmission path 52 is connected to one surface of each of the three metal films 55. The other surface of each of the three metal films 55 is connected to one of parallel surfaces (hereinafter, the one of parallel surfaces is referred to as an input surface of each of the negative-refractive-index lenses 56) of a corresponding one of the three negative-refractive-index lenses 56. Hereinafter, the other surface, of each of the negative-refractive-index lenses 56, parallel with the input surface is referred to as an output surface of each of the negative-refractive-index lenses 56. The three negative-refractive-index lenses 56 are positioned at such angles as to collect the inputted lights at point C. The three negative-refractive-index lenses 56 may contact with each other so as to form one component. The metal films 55 may not necessarily be made of metal, and may be made of any conductive material.

Hereinafter, an operation performed by the very small spot-size light beam forming apparatus 300 will be described with reference to FIG. 4. In the following description, the very small spot-size light beam forming apparatus 300 operates in air (light refractive index thereof=1). Firstly, the inputted light 51 is applied to each opening 54 through the optical transmission path 52. The opening diameter of each opening 54 is smaller than the wavelength of the inputted light 51 propagating through the optical transmission path 52. Therefore, although the inputted light 51 does not pass through each opening 54, near-field lights 59 (not shown) each having the diameter smaller than the wavelength of the inputted light 51 is generated at each opening 54 as if the near-field lights 59 seep through each opening 54. The near-field lights 59 are each inputted to a corresponding one of the negative-refractive-index lenses 56, and are collected as a near-field light 60 (not shown) at point C which is distanced from the output surface of each of the negative-refractive-index lenses 56 by a predetermined distance W. As described above, the negative-refractive-index lenses 56 are capable of collecting images (point light source) of incident lights as a perfectly same one light image (point light source). Thus, the near-field light 60 has the same diameter as each near-field light 59, and has an amount of light obtained by adding amounts of lights of the three near-field lights 59. W represents a value which is determined based on the refractive index (n=1) of air, the refractive index of the negative-refractive-index lens 56, and the thickness D of the negative-refractive-index lens 56. When the refractive index n of the negative-refractive-index lens 56=−1 is satisfied, W and D represent the same value.

The very small spot-size light beam forming apparatus 300, which is configured as described above, according to the third embodiment of the present invention can exert the same effect as the very small spot-size light beam forming apparatus 100 according to the first embodiment.

In the above description, the number of each of the metal films 55 and the negative-refractive-index lenses 56 is three. However, the present invention is not limited thereto. The number of each of the metal films 55 and the negative-refractive-index lenses 56 may be any number greater than one, and the increased number of each of the metal films 55 and the negative-refractive-index lenses 56 leads to increase of an amount of light of the near-field light 60 obtained at point C.

Figure 5:
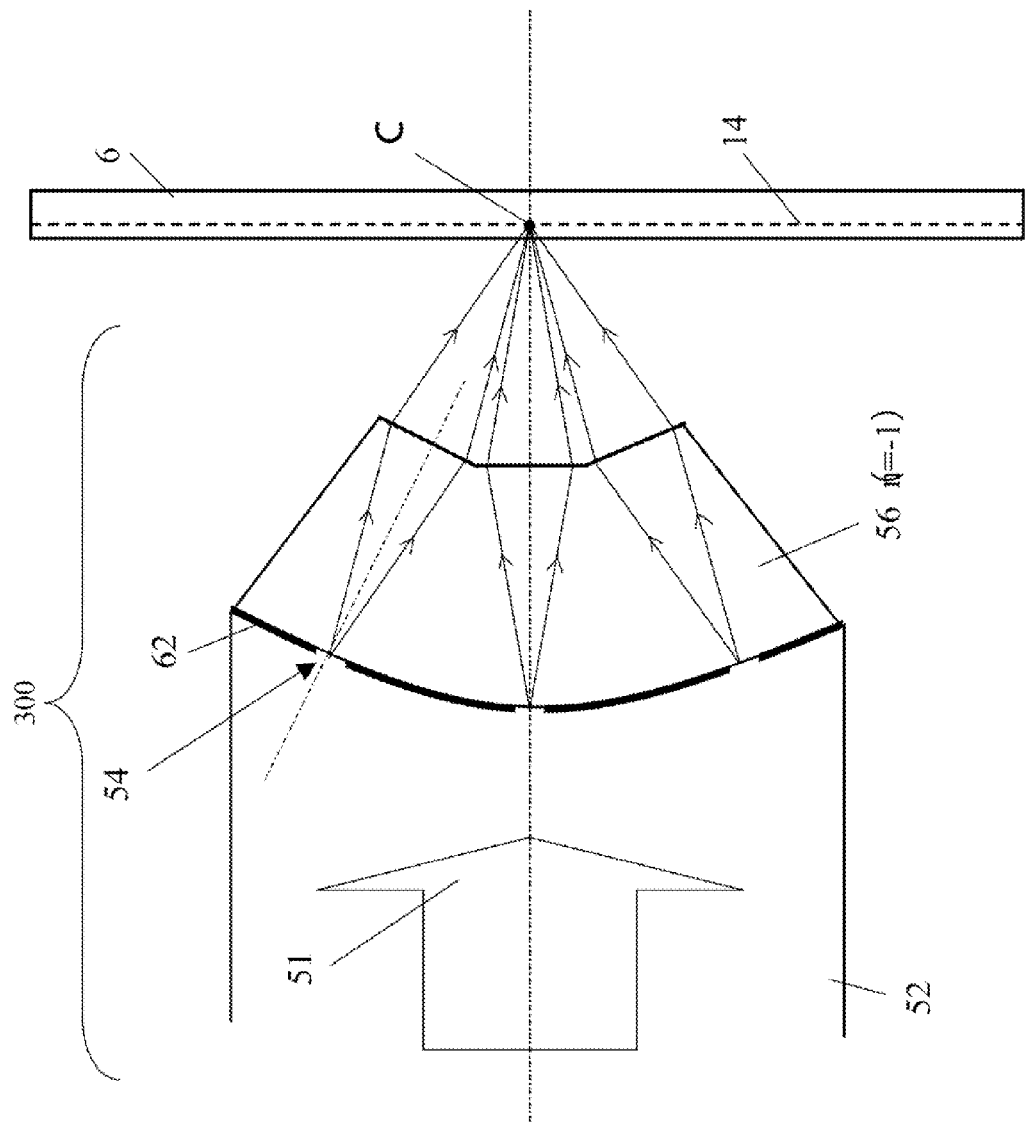
FIG. 5 is a diagram illustrating an exemplary modification of the very small spot-size light beam forming apparatus 300.

Further, FIG. 5 shows an exemplary modification of the very small spot-size light beam forming apparatus 300. As shown in FIG. 5, the plurality of negative-refractive-index lenses 56 may be integrated into one component having a curved input surface, and a metal film 62, which is obtained by integrating the plurality of metal films 55 into one component, may be connected to the curved input surface.

In the above description, the very small spot-size light beam forming apparatus 300 operates in air (refractive index thereof n=1). However, the very small spot-size light beam forming apparatus 300 may operate in any other medium which has a refractive index representing a value other than one. In this case, it is necessary to adjust a value of W.

Further, for example, the very small spot-size light beam forming apparatuses 100 and 200 according to the first and the second embodiments, respectively, are each capable of receiving the inputted light 7 having a wavelength which is greater than or equal to 400 nm and collecting the inputted light 7 on the recording surface 14 (point C) as the near-field light 20 having the diameter which is smaller than or equal to 100 nm. The very small spot-size light beam forming apparatus 300 according to the third embodiment is capable of receiving the inputted light 51 having a wavelength which is greater than or equal to 400 nm, and collecting the inputted light 51 on the recording surface 14 (point C) as the near-field light 60 having the diameter which is smaller than or equal to 100 nm.

While the invention has been described in detail, the foregoing description is in all aspects illustrative and not restrictive. It is understood that numerous other modifications and variations can be devised without departing from the scope of the invention.

What is claimed is:

1. A very small spot-size light beam forming apparatus for storing information in an optical information storage disk, the very small spot-size light beam forming apparatus comprising:
   a conductive film for generating a surface plasmon when an inputted light is applied thereto;
   a plurality of nano projections, each connected to the conductive film at one end, for receiving a portion of the surface plasmon, and outputting a plurality of input surface plasmons, respectively, from the other end of each of the plurality of nano projections, the other end of each of the plurality of nano projections having a diameter smaller than a wavelength of the inputted light;
   at coupling unit, connected to the other end of each of the plurality of nano projections, for receiving and coupling the plurality of input surface plasmons, so as to generate a coupled surface plasmon; and
   a negative-refractive-index lens, connected to the coupling unit and having a negative refractive index, for receiving a near-field light generated due to the coupled surface plasmon, and collecting the near-field light on a recording surface of the optical information storage disk,
   wherein a near-field light obtained through collection on the recording surface has a diameter smaller than the wavelength of the inputted light.

2. The very small spot-size light beam forming apparatus according to claim 1,
   wherein the coupling unit
      is a rectangular film made of a conductive material,
      is connected to the other end of each of the plurality of nano projections at positions, respectively, on a first edge of the coupling unit such that the plurality of nano projections form a structure symmetric with respect to a center of the first edge, and
      generates a multimode interference among the plurality of input surface plasmons having been inputted thereto, and couples the plurality of input surface plasmons so as to generate the coupled surface plasmon at a center of a second edge opposite to the first edge.

3. The very small spot-size light beam forming apparatus according to claim 1,
   wherein the coupling unit
      is a film unit which is made of a conductive material and shaped such that a plurality of rectangular films intersect each other at a center of a first edge of each rectangular film and a center of a second edge, of each rectangular film, opposite to the first edge,
      is connected to the other end of each of the plurality of nano projections at positions, respectively, on the first edge of each rectangular film such that the plurality of nano projections form a structure symmetric with respect to the center of the first edge of each rectangular film, and generates a multimode interference among the plurality of input surface plasmons having been inputted thereto, and couples the plurality of input surface plasmons so as to generate the coupled surface plasmon at the center of the second edge of each rectangular film.

4. The very small spot-size light beam forming apparatus according to claim 1, further comprising an optical transmission path, connected to the conductive film, for propagating the inputted light, and applying the inputted light to the conductive film.

5. The very small spot-size light beam forming apparatus according to claim 4, wherein the inputted light is applied from the optical transmission path to the conductive film at such an incident angle as to generate the surface plasmon.

6. The very small spot-size light beam forming apparatus according to claim 1, wherein the wavelength of the inputted light is greater than or equal to 400 nm, and a diameter of the near-field light obtained through the collection on the recording surface is smaller than or equal to 100 nm.

7. The very small spot-size light beam forming apparatus according to claim 1, wherein the conductive film, the plurality of nano projections, and the coupling unit are made of metal.

* * * * *